US009514158B1

(12) United States Patent
Macartney

(10) Patent No.: US 9,514,158 B1
(45) Date of Patent: Dec. 6, 2016

(54) METHODS, DEVICES, AND MEDIUMS ASSOCIATED WITH GENERATING A CHANGE HISTORY LISTING ASSOCIATED WITH A VALUE OF INFORMATION

(71) Applicant: INTELLECTUAL VENTURES FUND 79 LLC, Las Vegas, NV (US)

(72) Inventor: Michelle C. Macartney, Fall City, WA (US)

(73) Assignee: INTELLECTUAL VENTURES FUND 79 LLC, Las Vegas, NV (US)

( * ) Notice: Subject to any disclaimer, the term of this patent is extended or adjusted under 35 U.S.C. 154(b) by 182 days.

(21) Appl. No.: 14/163,116

(22) Filed: Jan. 24, 2014

(51) Int. Cl.
*G06F 17/30* (2006.01)

(52) U.S. Cl.
CPC ................ *G06F 17/3028* (2013.01)

(58) Field of Classification Search
USPC ................ 707/687, 695; 715/256, 255
See application file for complete search history.

(56) References Cited

U.S. PATENT DOCUMENTS

| 2008/0033922 A1* | 2/2008 | Cisler | G06F 17/30876 |
| 2011/0252301 A1* | 10/2011 | Vollmer | G06F 17/30994 715/229 |
| 2013/0326323 A1* | 12/2013 | Siwoff | G06F 17/2288 715/229 |
| 2014/0149857 A1* | 5/2014 | Vagell | G06F 17/24 715/255 |
| 2015/0052427 A1* | 2/2015 | Vagell | G06F 17/24 715/256 |

* cited by examiner

*Primary Examiner* — Hung T Vy
(74) *Attorney, Agent, or Firm* — Schwabe, Williamson & Wyatt

(57) ABSTRACT

In an example, an electronic device may be configured to determine whether a selection is received to display a change history corresponding to a value of information. The electronic device may be configured to generate a change history listing of at least one change instance corresponding to the value of the information in response to determining that the selection is received.

30 Claims, 8 Drawing Sheets

Class List for Mrs. Andersons's 4th Grade Class

Teacher Name: Mrs. Anderson

Student List

Luce Gilmore
Jane Sally
Daniel Grape
Bobby Balentine
Marc Samson
Isabelle McGrath
Candice Smith
Brett Phillips

51

53   Student List

Luce Gilmore
Jane Sally
Daniel Grape
Bobby Balentine
Marc Samson
Isabelle McGrath
Candice Smith
Brett Phillips Student List Luce Gilmore
Jane Sully
Daniel Grape
Marc Samson
Isabelle McGrath
Candice Smith
Brett Phillips
Julie Bransen

56

Change History for 4th Grade Class List

School Admin
(Original List)
12/10/2013

Anna Anderson
Changed: Jane ~~Sally~~ Sully
12/10/2013

School Admin
Added: Julie Bransen
12/15/2013

School Admin
Removed: Bobby Balentine
12/17/2013

School Admin
Removed: Brett Phillips
1/18/2013

School Admin
Added: Brett Phillips
3/14/2014

FIG. 5D

METHODS, DEVICES, AND MEDIUMS ASSOCIATED WITH GENERATING A CHANGE HISTORY LISTING ASSOCIATED WITH A VALUE OF INFORMATION

TECHNICAL FIELD

The present disclosure is related generally to tracking changes to a value of information, such as a value of information of a data store.

BACKGROUND

When dealing with information, such as a value of information of a data store, to which more than one individual has write access, data integrity may arise. To address the data integrity issues and/or to indicate to users accessing the data store a history of the changes, some known word processor programs include a "redlining" utility to track changes. Other known systems, such as databases, utilize change notes, such as "Last changed by (username) on (date)".

Known redlining and change note schemes may not scale well when there is more than one data update on a same value of the information. Known redlining and change note schemes also may not scale well when a significant number of different individuals make changes to the same value of the information.

DESCRIPTION OF THE DRAWINGS

FIGS. 5A-D depict an example defined change object.

DETAILED DESCRIPTION

Figure 1:
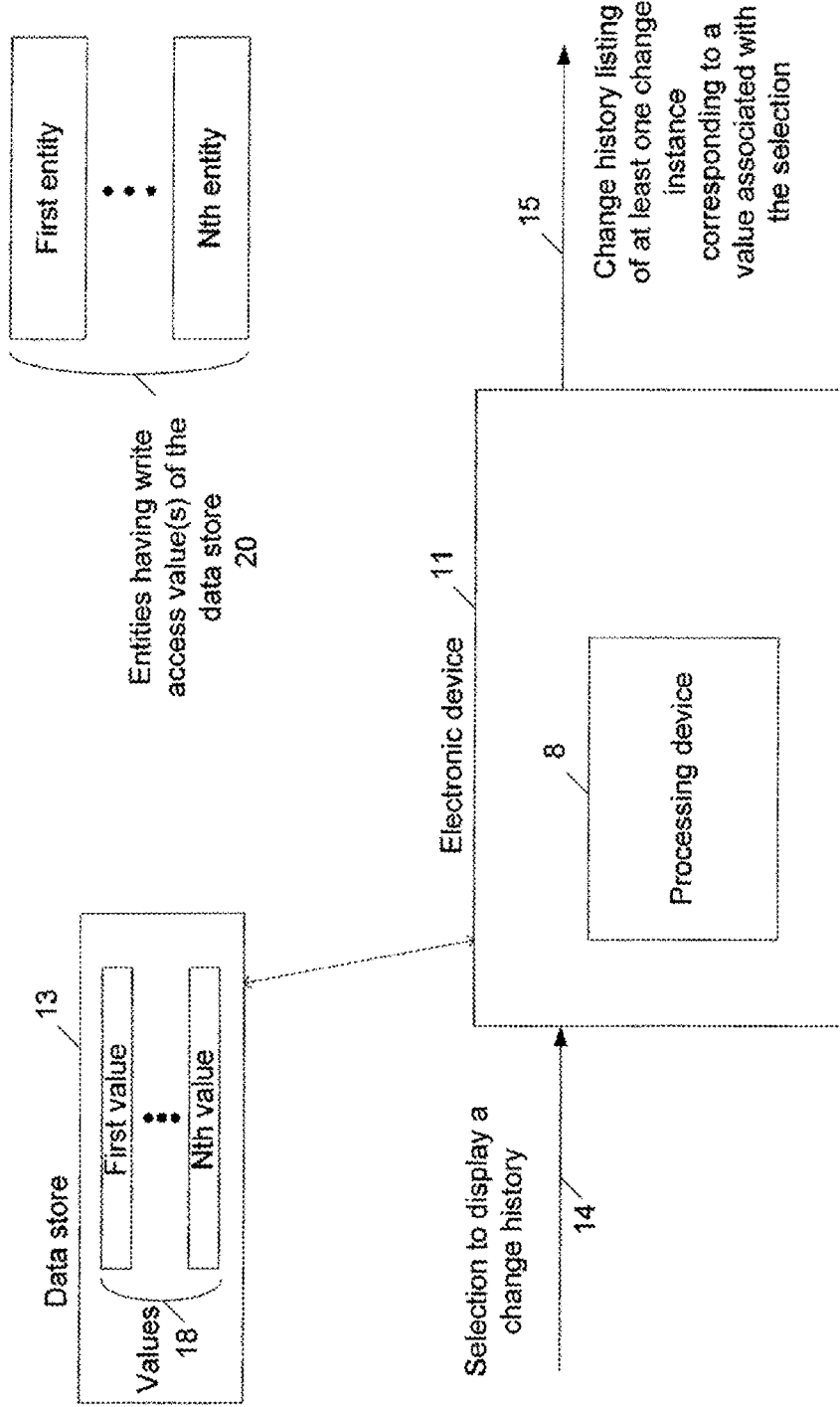
FIG. 1 depicts an example of a system for generating a change history listing associated with a value of information.

FIG. 1 depicts an example of a system 100 for generating a change history listing for a value of information. System 100 may include an electronic device 11 having a processing device 8. A data store 13 may be co-located with electronic device 11, or may be located remotely from electronic device 11. Data store 13 may include a word processing document, a database, or the like, or combinations thereof. A plurality 20 of entities may have write access to values 18 of data store 13. Each entity of plurality 20 may correspond to an individual or a machine, automated process, system, or the like, or combinations thereof.

In an example, processing device 8 may be configured to generate change history listing 15 of at least one change instance corresponding to a value of values 18. In another example, processing device 8 may be configured to generate change history listing 15 in response to receiving a selection 14 to display a change history.

In an example, processing device 8 may be configured to define a change object that associates a first value of values 18 with a second value of values 18. For example, processing device 8 may define the change object responsive to receiving an input, e.g., a user selection. For example, an administrator may create a change object when setting up a database, a user may create a change object when setting up a word processing document, web content, graphical content, or the like. Processing device 18 may be configured to generate change history listing 15 corresponding to the defined change object.

In an example, after displaying change history listing 15, processing device 8 may determine whether a selection is received to select a change instance of change history listing 15 that is not a most recent change instance of a value associated with change history listing 15. Selection may be made by hovering a point over a particular portion of change history listing 15, actuation of a graphical user interface element of change history listing 15, or the like, or combinations thereof. Processing device 8 may change the value of the information in data store 13 in response to determining that the selection is received. In an example, changing the value of the information of data store 13 may include undoing at least one write transaction associated with the value.

Change history listing 15 may include some of all of stored change instances corresponding to the value or the defined change object. Each change instance included in change history listing 15 may include various attributes that indicate the change, e.g., new data for the value or defined change object, a source of the new data (i.e. an entity of plurality 20), a date of input of the new data, a notes field that may be used to indicate reasons for the new data, or the like, or combinations thereof. Regarding the source of the new data, in an example, processing device 8 may be configured to display an image, e.g., a thumbnail photo, an icon, or the like, or combinations thereof, corresponding to the source. The source may be a human, i.e. and individual, or a non-human machine, process, system, or the like, or combinations thereof, that provides an input of the new data.

In an example, processing device 8 may be configured to display change history listing 15 concurrently with a display of a value associated with change history listing 15. In an example, less than all of change history listing 15 may be displayed concurrently with a display of a value associated with change history listing 15. Processing device 15 may be configured to display an interface, e.g., scroll controls, to allow different portions of change history listing 15 to be displayed concurrently with a display of a value associated with change history listing 15. In an example, there may be no need to leave the screen, window or page that a user is currently working on and viewing.

In an example, processing device 8 may be configured to display change history listing 15 responsive to a selection of a value associated with change history listing 15. The selection may be by any known scheme, e.g., hovering over a graphical user interface, actuating an element of a graphical user interface, or the like, or combinations thereof. In another example, processing device 8 may be configured to display a graphical user interface corresponding to the value or defined change object, e.g., a button, tab or the like, or combinations thereof.

In an example, processing device 8 may be configured to determine whether to configure a change object to cause a change instance corresponding to the change object to be created in response to an explicit command to create the change instance. Processing device 8 may be configured to define the change object responsive to a result of determining whether to configure the change object to cause the change instance corresponding to the change object to be created in response to the explicit command to create the change instance. For example, processing device 8 may configure the change object to control creation of a change instance in response to an explicit command, e.g., a right mouse click of a value of the change object. The command may be provided at a time, or around a time, that a change is made. Accordingly, a user may realize direct and customizable control of the creation of a change instance. The user may customize the capturing of changes in a way that makes the most sense for the content that is being changed, including deciding to cluster groupings of less significant changes into a single change instance to avoid cluttering the change history with too many changes, some of which may correspond to insubstantial changes.

In an example, processing device 8 may be configured to group a plurality of change history listings into a single display element. For example, processing device 8 may be configured to display a matrix having a column or row for each value or change object, with a row or column for each change instance of the plurality of change history listings.

Figure 2:
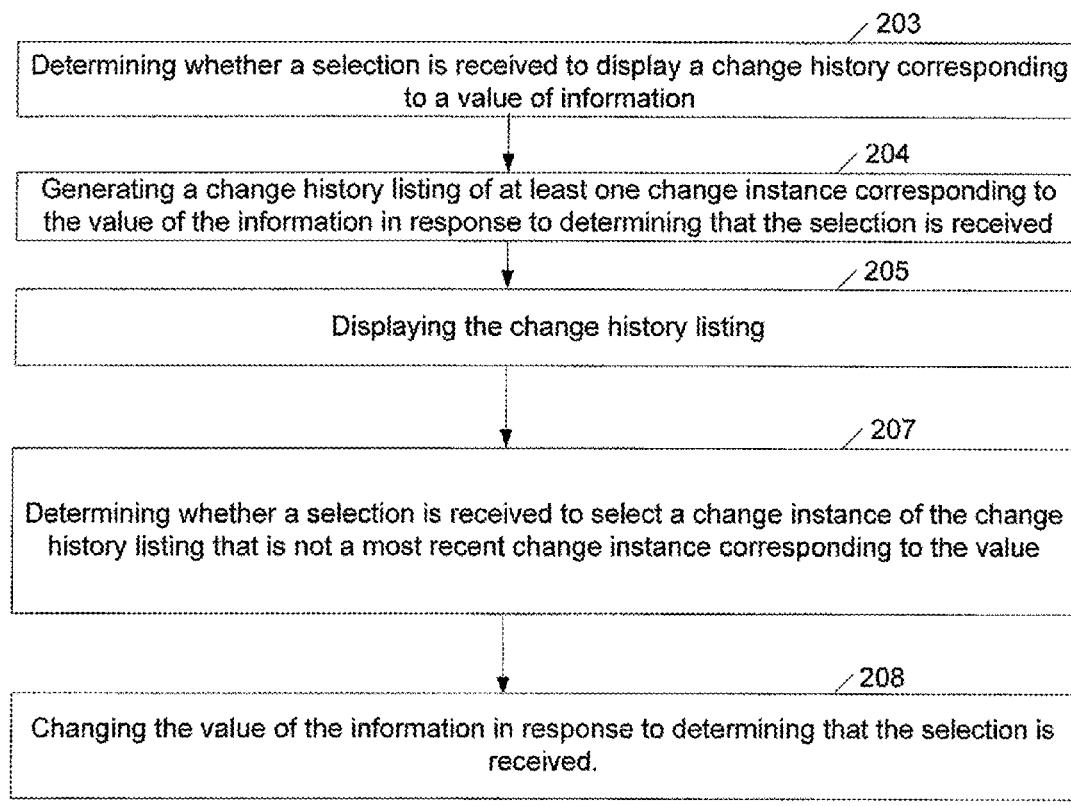
FIG. 2 depicts a flow chart of an example process for generating a change history listing associated with a value of information.

FIG. 2 depicts a flow chart of an example process for generating a change history listing associated with a value of information.

In block 203, a processing device, such as processing device 8, may determine whether a selection is received to display a change history corresponding to a value of information. In block 204, the processing device may generate a change history listing of at least one change instance corresponding to the value of the information in response to determining that the selection is received. In block 205, the processing device may display the change history listing.

In block 207, the processing device may determine whether a selection is received to select a change instance of the change history listing that is not a most recent change instance corresponding to the value. In block 208, the processing device may change the value of the information in response to determining that the selection is received.

Figure 3:
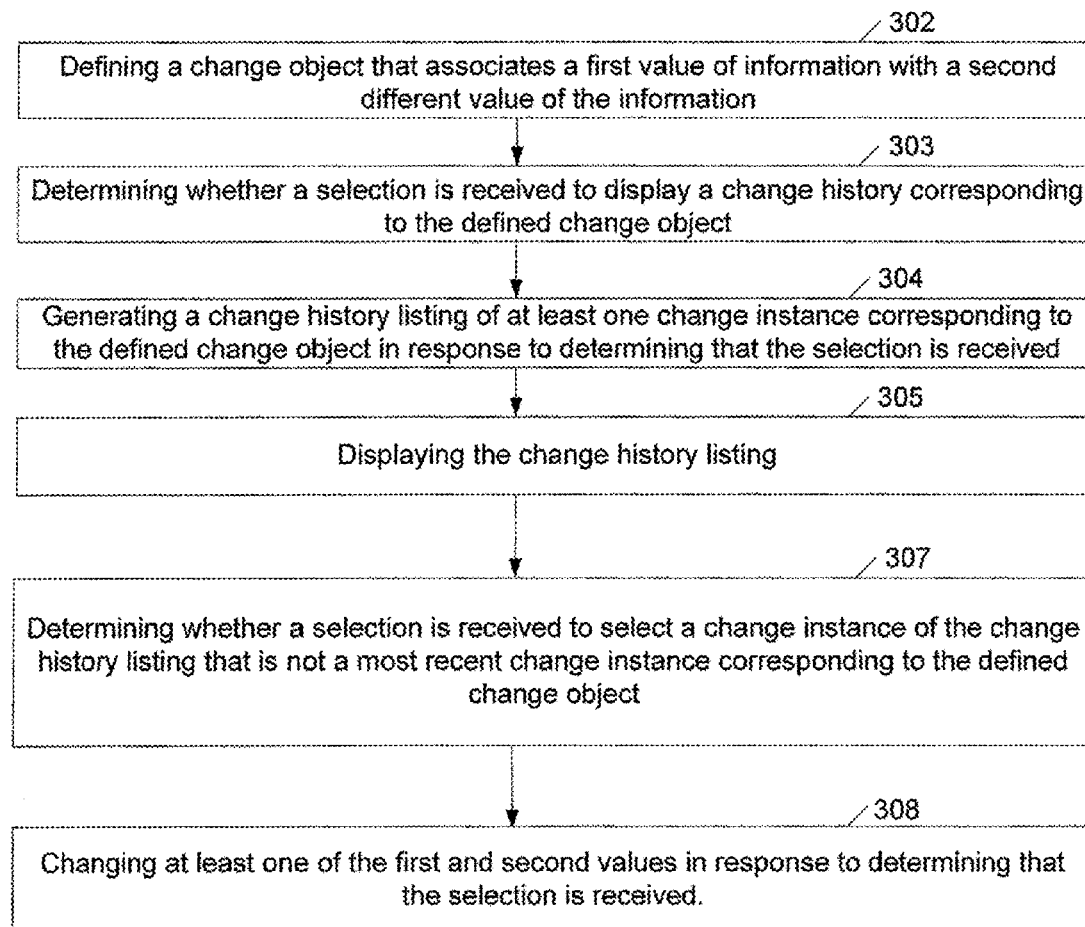
FIG. 3 depicts a flow chart of another example process for generating a change history listing associated with a value of information.

FIG. 3 depicts a flow chart of another example process for generating a change history listing associated with a value of information.

In block 302, a processing device, such as processing device 8, may define a change object that associates a first value of information with a second different value of the information. In block 303, the processing device may determine whether a selection is received to display a change history corresponding to the defined change object. In block 304, the processing device may generate a change history listing of at least one change instance corresponding to the defined change object in response to determining that the selection is received. In block 305, the processing device may display the change history listing.

In block 307, the processing device may determine whether a selection is received to select a change instance of the change history listing that is not a most recent change instance corresponding to the defined change object. In block 308, the processing device may change at least one of the first and second values in response to determining that the selection is received.

Figure 4:
FIG. 4 depicts an example change history listing.

FIG. 4 depicts an example change history listing 45. Example change history listing 45 corresponds to a value 44 of a database for storing patent information. In the depicted example, value 44 is a "filing status" of a selected patent of the database for storing patent information.

In the example, the change history listing 45 indicates all change instances for "filing status" value 44. In the example, the attributes of each change instance includes "source of change" (with thumbnail), "state" (which lists the newly changed status for "filing status" value 44), and "date" (showing the date of the change to the "filing status" value). In an example, change history listing 45 is displayed concurrently with a field 46 of the database showing data of value 44 responsive to a user selecting field 46, e.g., clicking on field 46, hovering a pointer over field 46, or the like, or combinations thereof.

FIGS. 5A-D depicts an example change object definition box 51 of a word processing document. To select a portion of the word processing document, e.g., a text portion, in an example, a user may highlight text to be included in a change object, right click a mouse, and select "define change object" from a menu, e.g., a drop-down menu. In the example, the names of a student list are shown to be highlighted.

In response to the highlighting and selecting of "define change object," a processing device, such as processing device 8, may display change object definition box 51 concurrently with the selected portion of the word processing document. The user may input a name in the name field of change object definition box 51, and may input a type in the type field of change object definition box 51. The type field may control the attributes included in a change history listing for the change object, e.g., a list type change object may capture change instances and/or show changes in a different way than a text string type change object or a value type change object. In the example, the name "4$^{th}$ Grade Class List" has been input into the name field, and "list" has been input into the type field. The input name and the input type become attributes associated with the change object. In another example, it may be possible, during the change object definition, to control the capturing of separate change instances by setting a sub-definition for types of changes that trigger the creation of a change instances, or the types of changes that do not trigger the creation of a change instance.

Figure 5A:
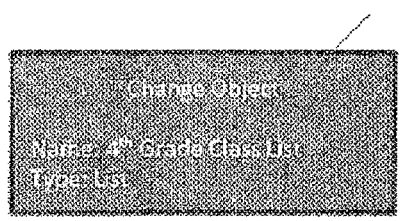
Figure 5B:

Referring now to FIG. 5B, after the change object is defined, the processing device may be configured to display an indicator 53 in the word processing document proximate, e.g., above, the portion of the word processing document that corresponds to the defined change object. Indicator 53 may be configured to be selectable to control the processing device displaying a change history listing for the defined change object.

Figure 5C:
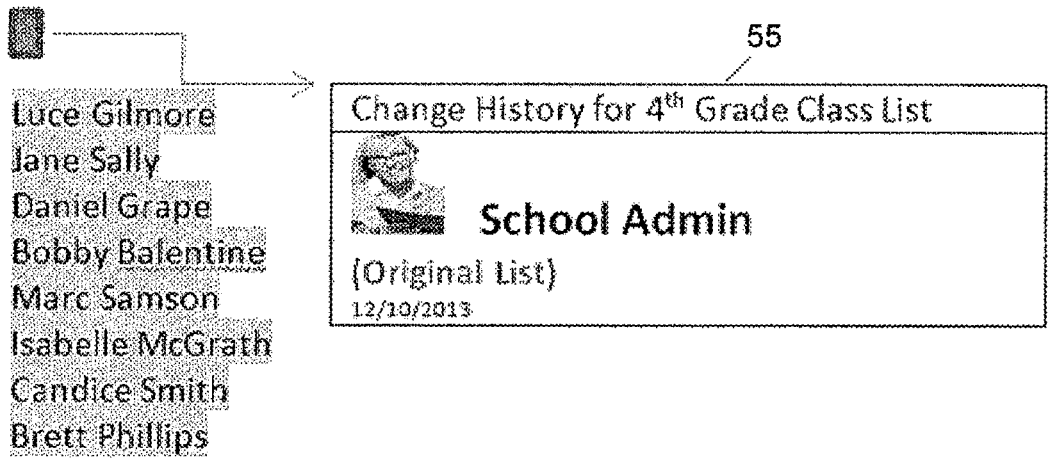

If indicator 53 is selected prior to any changes to the corresponding portion of the word processing document, then referring to FIG. 5C, the example change history listing 55 may be displayed. FIG. 5D shows an example change history listing 56 after several months and multiple changes to the corresponding portion of the word processing document. Example change history listing 56 includes all change instances, and indicates a chronology and detailed information about the class list changes that took place over the several month period. The information indicates details such as the fact that Brett Philips was removed from the student list in January, but then added back a couple months later. The text "(Original List)" in change history listing 56 may be selected to show/hide the portion of the word processing document that corresponds to the defined change object.

Generating a Change History Listing for a Value of Image Information

In an example, the value or the defined change object may correspond to a portion of an image, and a change instance may correspond to a modified version of an original image portion. A processing device, such as processing device 8, may be configured to include the modified image portion in a corresponding change instance in the change history listing. Including the modified image in the change history listing may allow a visual comparison of different versions of image information, and also may allow reversion from a most recent version of the image portion to a previous version of the image portion.

Figure 6:
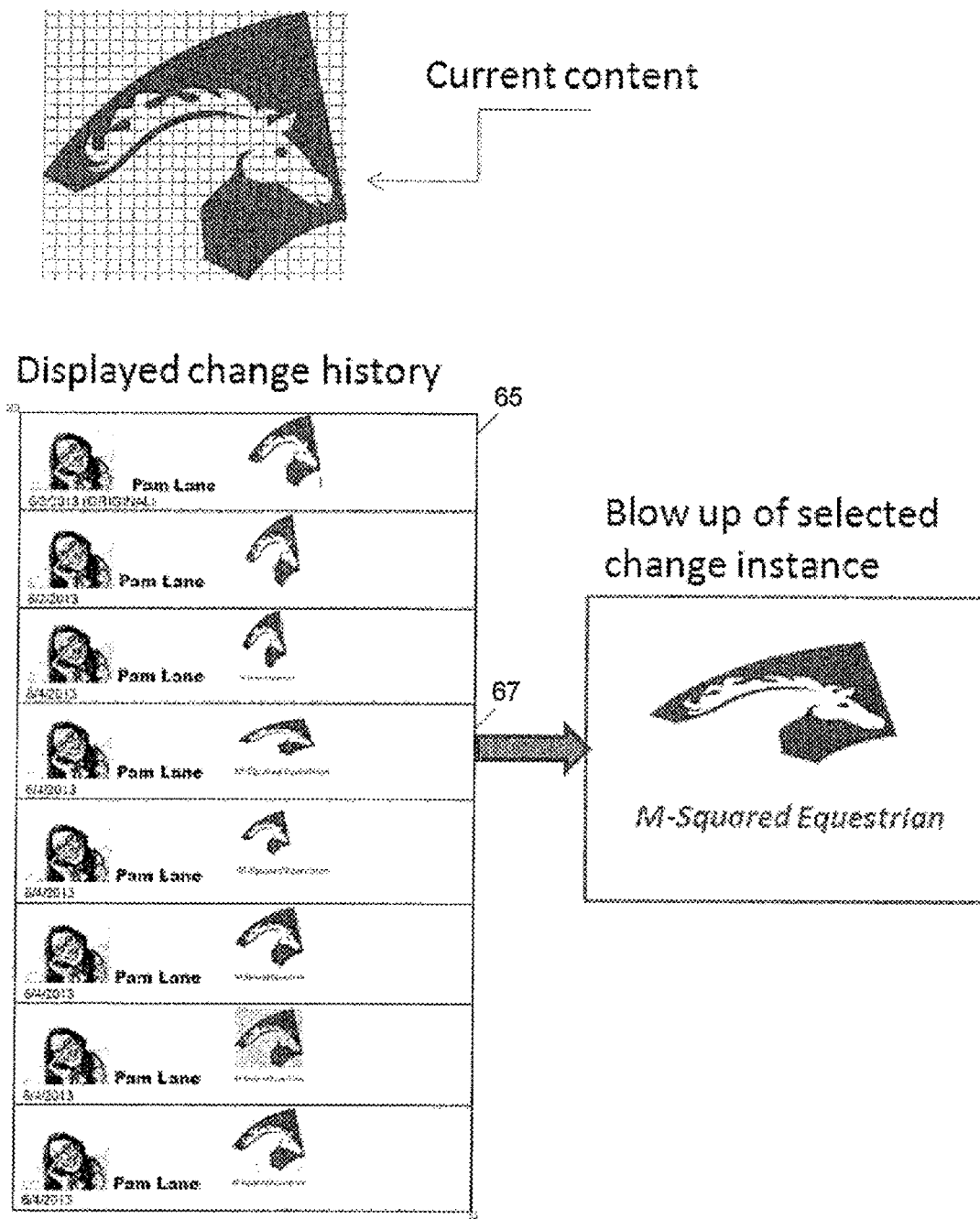
FIG. 6 depicts an example change history listing 65 for a value or defined change object of image information.

FIG. 6 depicts an example change history listing 65 for a value or defined change object of image information. Change history listing 65 includes change instances for a value or defined change object of image information. Each change instance in example change history listing 65 includes an image to allow visual comparison of different versions of an image, which may be useful for editing image information such as photos, web page displays, art projects, or the like. A processing device, such as processing device 8, may be configured to display an enlarged version of an image of a selected change instance responsive to selection of a corresponding change instance 67 of change history listing 65.

In an example, the processing device may be configured to revert a value or defined change object responsive to selection of a change instance that is not a most recent change instance corresponding to the value or defined change object. In an example, the processing device may be configured to perform a partial reversion of the defined change object responsive to the selection of a portion of a defined change object. For example, selected change instance 67 includes a text portion and an image portion. A partial revision of the defined change object may be performed responsive to the selection of the text portion so that current data for the defined change object corresponds to the image portion of the most recent change instance and the text portion of selected change instance 67.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. Claim is made to all modifications and variations coming within the spirit and scope of the following claims.

The invention claimed is:

1. A memory device having instructions stored thereon that, in response to execution by a processing device, cause the processing device to perform operations comprising:
   determining whether a selection is received to display a change history corresponding to a plurality of values of text and image information, wherein a plurality of entities have write access to the plurality of values of the text and image information;
   in response to determining that the selection is received, generating a change history listing of a first change instance for a first write transaction corresponding to the plurality of values of the text and image information and a second change instance for a second different write transaction corresponding to the plurality of values of the text and image information;
   wherein the change history listing includes an entry for each of the write transactions;
   displaying the change history listing; and
   in response to receipt of a user input for a user interaction corresponding to more than one entry of the entries of the change history listing, ascertaining whether to perform a third write transaction that is different than the second write transaction;

wherein the third write transaction is based on a text portion of one of the first and second write transactions and an image portion of the other of the first and second write transactions.

2. The memory device of claim 1, wherein at least one entity of the plurality of entities corresponds to an individual.

3. The memory device of claim 1, wherein the operations further comprise:
displaying data corresponding to the plurality of values of the text and image information concurrently with displaying the change history listing.

4. The memory device of claim 1, wherein the operations further comprise changing the plurality of values of the text and image information in response to an ascertainment to perform the third write transaction.

5. The memory device of claim 4, wherein changing the plurality of values of the text and image information comprises undoing a portion of each of the first and second write transactions.

6. The memory device of claim 1, wherein the operations further comprise:
displaying an image in the change history listing, wherein the image corresponds to a modified version of an original image based on at least one of the first and second change instances.

7. The memory device of claim 1, wherein the text and image information comprises information of a data store.

8. A method, comprising:
determining, using a processing device, whether a selection is received to display a change history corresponding to a plurality of values of text and image information, wherein a plurality of entities have write access to the plurality of values of the text and image information;
in response to determining, using the processing device, that the selection is received, generating a change history listing of a first change instance for a first write transaction corresponding to the plurality of values of the text and image information and a second change instance for a second different write transaction corresponding to the plurality of values of the text and image information;
wherein the change history listing includes an entry for each of the write transactions;
displaying the change history listing; and
in response to receipt of a user input for a user interaction corresponding to more than one entry of the entries of the change history listing, ascertaining whether to perform a third write transaction that is different than the second write transaction;
wherein the third write transaction is based on a text portion of one of the first and second write transactions and an image portion of the other of the first and second write transactions.

9. The method of claim 8, wherein at least one entity of the plurality of entities corresponds to an individual.

10. The method of claim 8, further comprising displaying data corresponding to the plurality of values of the text and image information concurrently with displaying the change history listing.

11. The method of claim 8, further comprising:
changing the plurality of values of the text and image information in response to an ascertainment to perform the third write transaction.

12. The method of claim 11, wherein changing the plurality of values of the text and image information further comprises undoing a portion of each of the first and second write transactions.

13. The method of claim 8, wherein the method further comprises:
displaying an image in the change history listing, wherein the image corresponds to a modified version of an original image based on a corresponding one of the first and second change instances.

14. The method of claim 8, wherein the text and image information comprises information of a data store.

15. A memory device having instructions stored thereon that, in response to execution by a processing device, cause the processing device to perform operations comprising:
defining a change object that associates a first value of text and image information with a second different value of the text and image information, wherein a plurality of entities have write access to the first and second values of the text and image information;
determining whether a selection is received to display a change history corresponding to the defined change object;
in response to determining that the selection to display the change history corresponding to the defined change object is received, generating a change history listing of a plurality of change instances corresponding to the defined change object;
wherein the change history listing includes an entry for each of write transaction of the plurality of change instances;
displaying the change history listing; and
in response to receipt of a user input for a user interaction corresponding to more than one entry of the entries of the change history listing, ascertaining whether to perform a new write transaction;
wherein the new write transaction is based on a text portion of one of the write transactions of the plurality of change instances and an image portion of the other of the write transactions of the plurality of change instances.

16. The memory device of claim 15, wherein at least one entity of the plurality of entities corresponds to an individual.

17. The memory device of claim 15, wherein the operations further comprise:
changing the plurality of values of the text and image information in response to an ascertainment to perform the new write transaction.

18. The memory device of claim 17, wherein changing the plurality of values of the text and image information includes performing partial revisions based on subsets of the write transactions of the plurality of change instances.

19. The memory device of claim 15, wherein the text and image information comprises a subset of information of a data store.

20. The memory device of claim 15, wherein defining the object that associates the first value of the text and image information with the second different value of the text and image information further comprises associating an information type with the first and second values of the text and image information.

21. The memory device of claim 20, wherein the associated information type controls a format used to generate the change history listing.

22. The memory device of claim 15, wherein defining the change object further comprises:

determining whether to configure the change object to cause change instance generation to occur in response to an explicit command for the change instance generation; and defining the change object responsive to a result of the configuration determination.

23. A method, comprising:

defining a change object that associates a first value of text and image information with a second different value of the text and image information, wherein a plurality of entities have write access to the first and second values of the text and image information;

determining, using a processing device, whether a selection is received to display a change history corresponding to the defined change object;

in response to determining that the selection to display the change history corresponding to the defined change object is received, generating, using the processing device, a change history listing of a plurality of change instances corresponding to the defined change object;

wherein the change history listing includes an entry for each write transaction of the plurality of change instances;

displaying the change history listing; and in response to receipt of a user input for a user interaction corresponding to more than one entry of the entries of the change history listing, ascertaining, using the processing device, whether to perform a new write transaction;

wherein the new write transaction is based on a text portion of one of the write transactions of the plurality of change instances and an image portion of the other of the write transactions of the plurality of change instances.

24. The method of claim 23, wherein at least one entity of the plurality of entities corresponds to an individual.

25. The method of claim 23, further comprising:

changing the plurality of values of the text and image information in response to an ascertainment to perform the new write transaction.

26. The method of claim 25, wherein changing the plurality of values of the text and image information includes performing partial revisions based on subsets of the write transactions of the plurality of change instances.

27. The method of claim 23, wherein the text and image information comprises a subset of information of a data store.

28. The method of claim 23, wherein defining the object further comprises associating an information type with the values of the text and image information.

29. The method of claim 28, wherein the associated information type controls a format used to generate the change history listing.

30. The method of claim 23, wherein defining the change object further comprises:

determining whether to configure the change object to cause change instance generation to occur in response to an explicit command for the change instance generation; and defining the change object responsive to a result of the configuration determination.

\* \* \* \* \*